Patented Mar. 5, 1935

1,993,097

UNITED STATES PATENT OFFICE 1,993,097

METAL CLEANING COMPOSITION

Paul Hodges, Tuscaloosa, Ala., assignor to Gulf States Paper Corporation, a corporation of Delaware No Drawing. Application April 20, 1933, Serial No. 667,045

8 Claims. (Cl. 87—5)

My invention relates to metal cleaning compositions, particularly compositions for removing rust, scale, corrosion, grease and paint markings from metal surfaces, and has for an object the provision of such compositions which shall contain as a principal ingredient thereof what is known in the paper industry as "floating soap."

"Floating soap" is that saponaceous product which is formed in the black liquor produced in the digestion process in the production of paper or other cellulosic products by the sulphate or soda process, and which in part separates and floats to the top of the liquor drained from the pulp after digestion, and which also is in part in solution in the liquor and may be separated out by centrifugal separation or other methods.

"Floating soap", so called, contains the alkali salts of a complexity of fatty and resinous acids, higher alcohols, and a number of other compounds, many of which have not as yet been identified. While no dependable analysis of "floating soap" is available, it is known to treat the product, for example, as set forth in the U. S. patent to Michelson No. 1,823,752, in such a manner as to free the acid constituents and alcohols from the "floating soap" and obtain a complex mixture of such constituents which is known in the trade as "Tallol."

My invention has for a further object the provision of a metal treating composition which shall contain as a principal ingredient "floating soap."

A still further object of my invention is the provision of a rust removing agent and metal cleaner which shall contain any one or more of a number of known compounds having solvent properties adapted for metal cleaning, together with "floating soap" and, in the case of emulsions, a stabilizing agent which may comprise any fatty acid, such as rosin or "tallol," or any mineral acid which will form a fatty acid with the "floating soap." In using the term "solvent" it is to be understood that I use it in its broader sense, that is, a liquid used to loosen as well as to dissolve incrusting material.

I have discovered that "floating soap" alone has remarkable penetrating properties, and is an effective agent for the removal of rust, corrosion, scale, grease, acid and paint from metal surfaces. When combined with other substances, such as hereinafter mentioned, having the property of dissolving the substances to be removed, I have found that it greatly enhances those properties.

Among the solvents which I have found to be especially useful might be mentioned amylene dichlorides, ethylene dichloride, trichlorethylene, diacetone, isopropyl ether, carbon tetrachloride, mono methyl ethylene glycol ether, dioxan, acetone, ethyl lactate, mono ethyl ethylene glycol ether, dichlormethane, ethyl acetate, turpentine, kerosene, gasoline. Other equivalent solvents will suggest themselves to those skilled in the art.

The amylene dichlorides mentioned above are sold on the open market and comprise a mixture of amylene dichlorides in which the chlorine atoms are attached to adjacent carbon atoms.

One example of my invention, in the form of an emulsion, may comprise the following:

Example 1

| | Percent |
|---|---|
| Amylene dichlorides | 20.0 |
| Oleic acid | 3.3 |
| "Floating soap" | 10.0 |
| Water | 66.7 |

In making the above emulsion, the "soap," oleic acid and amylene dichlorides are preferably heated together to about 165° F. The mixture is stirred slowly with a mechanical agitator and as soon as the "soap" is fairly well dissolved, the water at about the temperature of the mixture is added and the mixture agitated until a smooth creamy emulsion is produced. The emulsion thus produced, I have found to be very stable, and I think permanent, sample batches made up in the manner described having stood for more than a month without separating out. The constituents described above may be mixed cold, but I have found the emulsion resulting therefrom less stable than when mixed hot. However, the rust removing and metal cleaning qualities of the mixture appear to be substantially the same, whether mixed hot or cold.

If desired, a finely divided abrasive, such as powdered flint, stack ash, silicon carbide or aluminum oxide, may be added to the emulsion when making it. The abrasive will be found to accelerate the removal of rust and other foreign substances from the metal surfaces. Any desired amount may be added, though 5% will ordinarily be found to be sufficient.

The oleic acid mentioned in Example 1 acts as a stabilizer for the emulsion. In place of the oleic acid, I may use any fatty acid, such as rosin or "tallol", or any mineral acid which will form a fatty acid with the "floating soap". Where rosin is substituted for the oleic acid, a higher temperature is required in forming the emulsion, for obvious reasons.

Where "tallol" is substituted for oleic acid, the resulting emulsion is not quite so smooth as that produced with the oleic acid. As is well known, "tallol" is that product produced by the reaction of a strong acid, such as sulphuric, with "floating soap", the result of such reaction being to free the resins and fatty acids from the soap, said freed resins and fatty acids being known as "tallol".

Another form of my improved rust remover, which may be found more effective for certain purposes, in the form of a solution, may comprise the following:

*Example 2*

| | Percent |
|---|---|
| Amylene dichlorides | 37.5 |
| Alcohol | 37.5 |
| "Floating soap" | 25.0 |

The constituents are mixed and stirred cold until a good solution is obtained.

In the product given in Example 2, I have found that the solvent properties of amylene dichlorides and alcohol are greatly enhanced by the "floating soap", due, in my opinion, to the remarkable penetrating properties which I have found that the "soap" possesses. The solution given in Example 2 may be employed by simply wetting the surface of the article to be cleaned, as by spraying or dipping, allowing it to stand for a few minutes, and then brushing it off. With emulsion types, they may be sprayed or brushed on, or the article may be dipped into the emulsion. About five minutes after application the rust, grease and paint may be readily scraped, rubbed or brushed off. Where large surfaces are to be cleaned, a power driven brush greatly facilitates the speed of removal. The rate of removal may also be greatly accelerated by the additon of up to 5% of an abrasive to the emulsion, as heretofore described, and when so added to the emulsion, the abrasive will remain in suspension and will not settle out of the emulsion. The surface of the metal may be painted without removing the film of emulsion therefrom, though if an abrasive has been incorporated in the emulsion, it should be removed. Also, if the surface is to be electroplated, the composition should be washed off, which may conveniently be done with hot water.

In removing rust, grease, acids and paints from metal articles in a moving production line it is often desirable to spray the metal with or immerse it in the removing compound. It is then desirable to have a composition of more aggressive action on the coatings. For this purpose I have found it desirable to form a solution comprising a solvent or combination or solvents, "floating soap" and a mineral acid. The most desirable mineral acid has been found to be phosphoric. One example of such a solution made in accordance with my invention is as follows:

*Example 3*

| | Percent |
|---|---|
| Mono butyl ethylene glycol ether | 30 |
| Phosphoric acid—85% $H_3PO_4$ | 50 |
| "Floating soap" | 20 |

The constituents are mixed and stirred until a good solution is obtained. It will be understood, of course, that the phosphoric acid entering into the solution combines in part with the "floating soap" to form "tallol". The remainder remains as free acid.

In the product given in Example 3 I have found that the solvent properties of mono butyl ethylene glycol ether are greatly enhanced by the "floating soap" and that the phosphoric acid aids in completely cleaning the metal surface by dissolving pigments, rust, scale, soldering "acid", and other incrustants. The solution given in Example 3 may be employed by wetting the surface of the metal with the solution by dipping or spraying and after a short contact period (5 to 15 minutes), washing off with water.

In Example 3 other solvents such as butyl, mono butyl diethylene glycol ether, mono ethyl diethylene glycol ether, mono ethyl ethylene glycol ether, mono methyl ethylene glycol ether, butyl lactate, butyl alcohol, diacetone, dioxan, ethyl lactate, acetone, ethyl alcohol, methyl alcohol, isopropyl alcohol and similar solvents may be used.

Among the advantages and novel properties of "floating soap" as a constituent of the emulsion or solvent type of rust removers are:

(1) The emulsion tends to carry the particles of rust, corroded metal or scale into suspension.

(2) The penetrating properties of the "soap" allow it to penetrate beneath the particles of rust and thus aid removal.

(3) It presents a cheap emulsifying agent for usual rust removing solvents.

(4) It is an excellent inhibitor for further rusting even when highly diluted with water.

(5) It will remove wax, grease, acids, tar and paint present.

(6) It suspends abrasives easily.

(7) The wax content aids staying on work.

(8) It may be removed from work with water.

(9) Any "soap" remaining will not be detrimental to an overcoat of paint.

(10) High water content of the emulsion tends to eliminate the fire hazard and greatly decreases loss of solvent during both use and storage.

It will be obvious from the foregoing that I have devised an improved metal treating composition having incorporated as a principal ingredient therein "floating soap", which is extremely economical of manufacture, being made principally from a waste product of the paper industry, and which is remarkably effective for the purposes described.

It will also be apparent that the proportions given in the examples recited herein are to be taken as illustrative only, and that they may be varied from widely, without departing from the spirit of my invention; and while I have described my invention in several forms, it will be obvious to those skilled in the art that it is not so limited, but is susceptible of various other changes and modifications, without departing from the spirit thereof. I desire, therefore, that only such limitations shall be placed thereupon as are imposed by the prior art or as are specifically set forth in the appended claims.

What I claim is:

1. A metal cleaning and corrosion inhibiting composition comprising "floating soap" obtained from the black liquors in the manufacture of soda or sulphate cellulosic material, an organic metal cleaning solvent, and water, the "soap" comprising at least 20% of the active ingredients.

2. A metal cleaning and corrosion inhibiting composition comprising "floating soap" obtained from the black liquors in the manufacture of soda or sulphate cellulosic material, an organic metal cleaning solvent, water, and sufficient higher fatty acid to form a stable emulsion, the "soap" comprising at least 20% of the active ingredients.

3. A metal cleaning and corrosion inhibiting composition comprising "floating soap" obtained from the black liquors in the manufacture of soda or sulphate cellulosic material, and a chlorinated hydrocarbon metal cleaning solvent, the "floating soap" comprising at least 20% of the active ingredients.

4. A metal cleaning and corrosion inhibiting composition comprising "floating soap" obtained from the black liquors in the manufacture of soda or sulphate cellulosic material, and a mixture of metal cleaning solvents selected from the following: Amylene dichlorides, trichlorethylene, ethylene dichloride, dichlormethane, the "floating soap" comprising at least 20% of the active ingredients in the composition.

5. A metal cleaning and corrosion inhibiting composition comprising "floating soap" obtained from the black liquors in the manufacture of soda or sulphate cellulosic material in an amount at least 20% of the active ingredients, an organic metal cleaning solvent in an amount at least 40% of the active ingredients, water, sufficient oleic acid to form a stable emulsion, and an appreciable amount of a finely divided inorganic abrasive.

6. A metal cleaning and corrosion inhibiting composition comprising "floating soap" obtained from the black liquors in the manufacture of soda or sulphate cellulosic material, an organic metal cleaning solvent, and alcohol, the "soap" comprising at least 20% of the active ingredients.

7. A metal cleaning and corrosion inhibiting composition comprising "floating soap" obtained from the black liquors in the manufacture of soda or sulphate cellulosic material, amylene dichloride, and alcohol, the "floating soap" comprising at least 20% of the active ingredients.

8. A metal cleaning and corrosion inhibiting composition comprising "floating soap" obtained from the black liquors in the manufacture of soda or sulphate cellulosic material, phosphoric acid, and an organic metal cleaning solvent adapted to enter into solution with the "floating soap" and the phosphoric acid, the "floating soap" comprising approximately 20% of the active ingredients.

PAUL HODGES.